(12) United States Patent
Merry

(10) Patent No.: US 8,719,788 B2
(45) Date of Patent: May 6, 2014

(54) TECHNIQUES FOR DYNAMICALLY DETERMINING TEST PLATFORMS

(75) Inventor: Colin R. Merry, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1375 days.

(21) Appl. No.: 12/125,930

(22) Filed: May 23, 2008

(65) Prior Publication Data

US 2009/0292952 A1 Nov. 26, 2009

(51) Int. Cl.
*G06F 9/44* (2006.01)
*G06F 11/36* (2006.01)

(52) U.S. Cl.
CPC ........ *G06F 11/3664* (2013.01); *G06F 11/3684* (2013.01)
USPC .......................................................... 717/124

(58) Field of Classification Search
CPC .......................... G06F 11/3664; G06F 11/3684
USPC .......................................................... 717/124
See application file for complete search history.

(56) References Cited

U.S. PATENT DOCUMENTS

| | | | |
|---|---|---|---|
| 5,629,878 A * | 5/1997 | Kobrosly ...................... | 702/120 |
| 6,332,211 B1 * | 12/2001 | Pavela ........................... | 717/130 |
| 6,931,408 B2 * | 8/2005 | Adams et al. ................. | 707/812 |
| 6,993,747 B1 | 1/2006 | Friedman | |
| 7,243,337 B1 | 7/2007 | Cowan | |
| 7,299,451 B2 | 11/2007 | Dygon et al. | |
| 2003/0131285 A1 | 7/2003 | Beardsley et al. | |
| 2003/0188298 A1 | 10/2003 | Shaposhnick | |
| 2005/0223362 A1 * | 10/2005 | Whitlock et al. ............. | 717/126 |
| 2006/0253588 A1 * | 11/2006 | Gao et al. ..................... | 709/226 |
| 2007/0022324 A1 | 1/2007 | Chang et al. | |
| 2007/0083588 A1 * | 4/2007 | Keller et al. .................. | 709/202 |
| 2007/0214391 A1 | 9/2007 | Castro et al. | |
| 2007/0234293 A1 | 10/2007 | Noller et al. | |
| 2007/0234316 A1 | 10/2007 | Bayerlein | |
| 2009/0006066 A1 * | 1/2009 | Behm et al. .................... | 703/15 |

OTHER PUBLICATIONS

Budinsky, et al.,"WebSphere Studio Overview", IBM Systems Journal, vol. 43, No. 2, 2004, 22 Pages, http://www.research.ibm.com/journal/sj/432/budinsky.html.

* cited by examiner

*Primary Examiner* — Wei Zhen
*Assistant Examiner* — Lanny Ung
(74) *Attorney, Agent, or Firm* — Jim Sfekas; Kate Drakos; Micky Minhas

(57) ABSTRACT

Various technologies and techniques are disclosed for dynamically determining test platforms. A test platform matrix is generated for use with a test run. The test platform matrix is generated based on a combination of test coverage specifications and a history of test coverage from prior runs. Machines are provisioned for executing the test run according to the test platform matrix. Different system configurations are tested than prior system configurations that were tested in a most recent prior run.

12 Claims, 5 Drawing Sheets

TECHNIQUES FOR DYNAMICALLY DETERMINING TEST PLATFORMS

BACKGROUND

Software developers write software programs using one or more software development programs. Once one or more portions of a given software program is finished, its functionality is tested. Testing enables the developer and/or test team to test different scenarios to ensure that the software program performs as desired. One area of software testing is to run applications on all supported platforms and system locales. This is traditionally a manual process that is achieved by planning a schedule of targeted platforms for a product, and then keeping track of which platforms were tested to ensure comprehensive coverage of all desired platforms. This manual process can be particularly complex for enterprise software that runs across multiple tiers or computers. One reason for the complexity is because multi-tier software can have a matrix of test combinations that is too large to test comprehensively on every iteration in a manual fashion. In addition, the manual process of determining the platforms to test can not only be complex, but can also be error prone which could result in gaps in platform coverage.

SUMMARY

Various technologies and techniques are disclosed for dynamically determining test platforms. A test platform matrix is generated for use with a test run. The test platform matrix is generated based on a combination of test coverage specifications and a history of test coverage from prior runs. Machines are provisioned for executing the test run according to the test platform matrix. Different system configurations are tested than prior system configurations that were tested in a most recent prior run.

In one implementation, a method for generating and executing a test platform matrix for a next iteration of a test run is described. A run type to be executed is determined. One or more contexts for the run type are retrieved. A number of tiers that are needed for each of the contexts is determined. Tier objects are created, with one tier object being created for each of the tiers for each of the contexts. For each of the tier objects, package mapping information is retrieved for a package map record having a lowest reference count value. A machine is provisioned for each of the tier objects according to the package mapping information.

In another implementation, a data structure is described for storing a test platform matrix. A run type data structure is used for storing run types to be tested over a plurality of test runs. A run context data structure is used for storing relationships between the run types and contexts for the run types. A tier type data structure is used for storing tier types for the run types and contexts. A context tier count data structure is used for storing an instance count for each tier type for each of the contexts. A package mapping data structure is used for storing details for each instance of the tier types.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that dynamically determines test platforms, but the technologies and techniques also serve other purposes in addition to these. In one implementation, one or more of the techniques described herein can be implemented as features within a software development program with testing capabilities such as MICROSOFT® Visual Studio, or from any other type of program or service that facilitates testing of software programs.

In one implementation, the technologies and techniques described herein can be used for describing and storing a desired coverage matrix for a software program, across any number of tiers. Target platforms are then calculated on request using an algorithm that selects the appropriate configuration based on a combination of the desired coverage and the historical coverage achieved so far.

Figure 1:
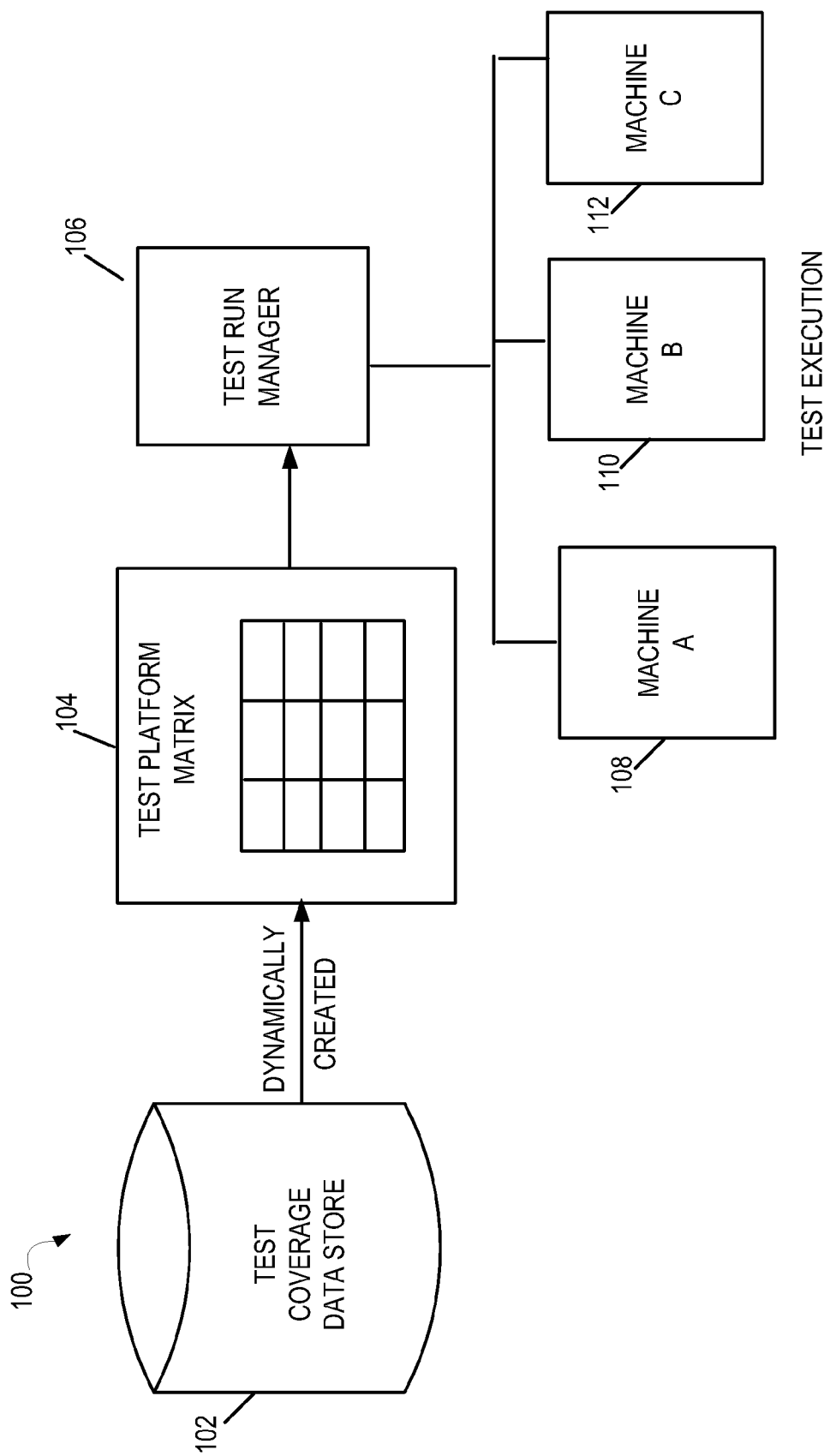
FIG. 1 is a diagrammatic view of a dynamic test platform system.

FIG. 1 illustrates a dynamic test platform system 100 of one implementation. Test coverage data store 102 is responsible for storing data that is used to dynamically generate a test platform matrix 104. An example data structure than can be used for test coverage data store is shown in FIG. 4. The term "test platform matrix" as used herein is meant to include "a plurality of specifications that describe different configurations of an environment in which a software program should be tested". A test run manager 106 uses the test platform matrix 104 to provision one or more machines to execute the test, such as machine A (108), machine B (110), and machine C 112). Test run manager 106 carries out one or more parts of the processes described in FIGS. 2 and 3 to utilize the test platform matrix for carrying out the tests, which will now be discussed.

Figure 2:
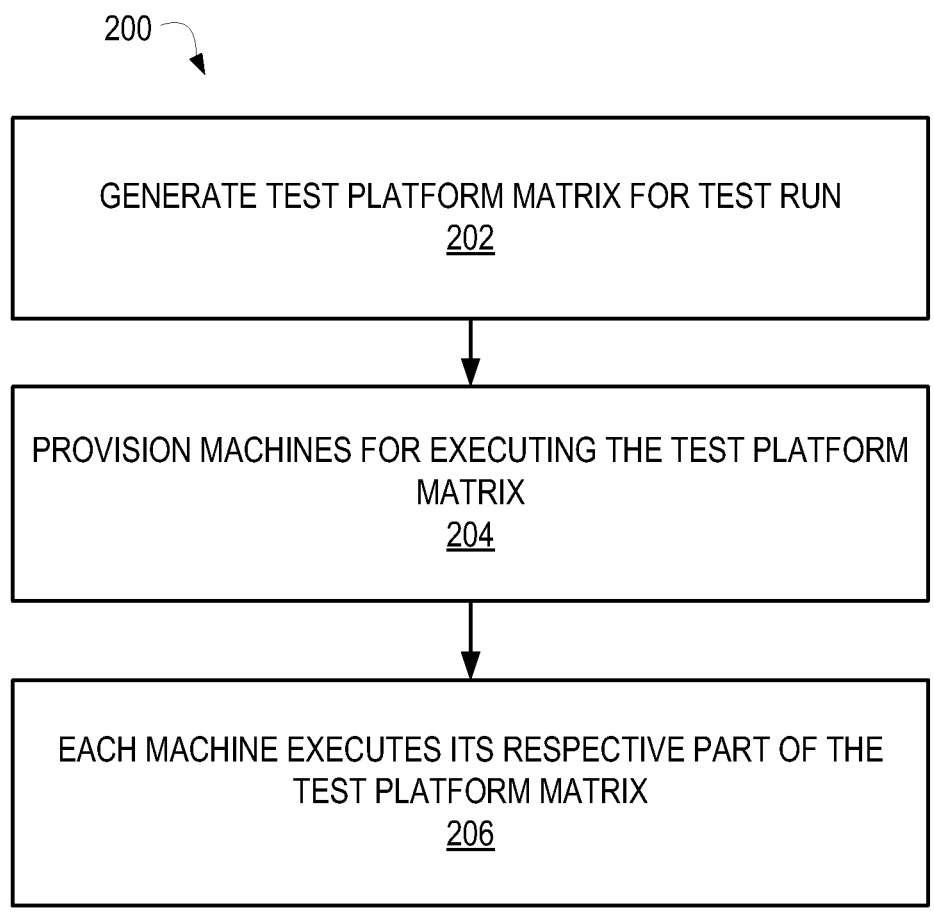
FIG. 2 is a high level process flow diagram for one implementation illustrating the stages involved in generating a test platform matrix dynamically.
Figure 3:
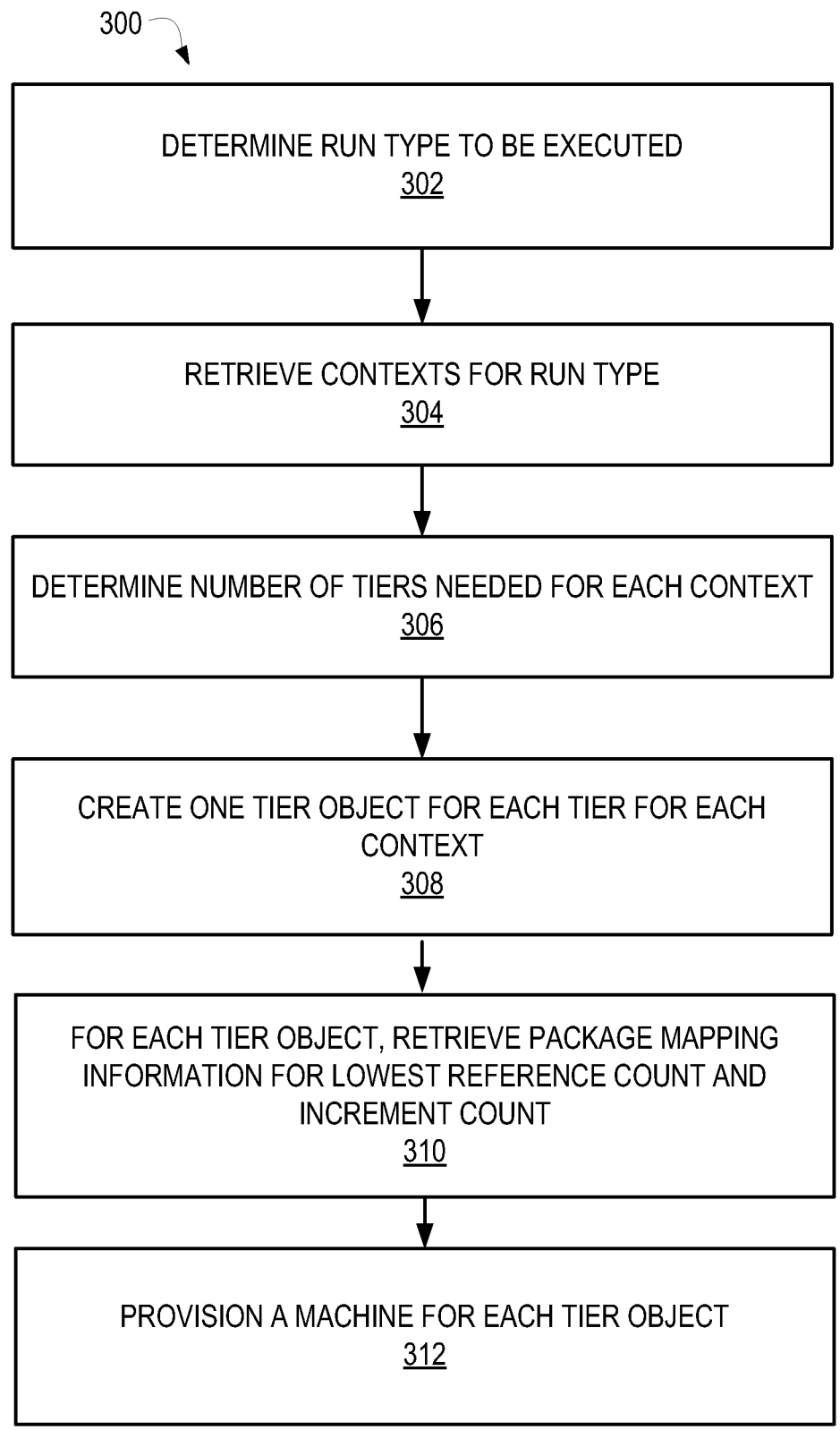
FIG. 3 is a process flow diagram for one implementation illustrating the stages involved in dynamically generating a text platform matrix for carrying out tests.
Figure 4:
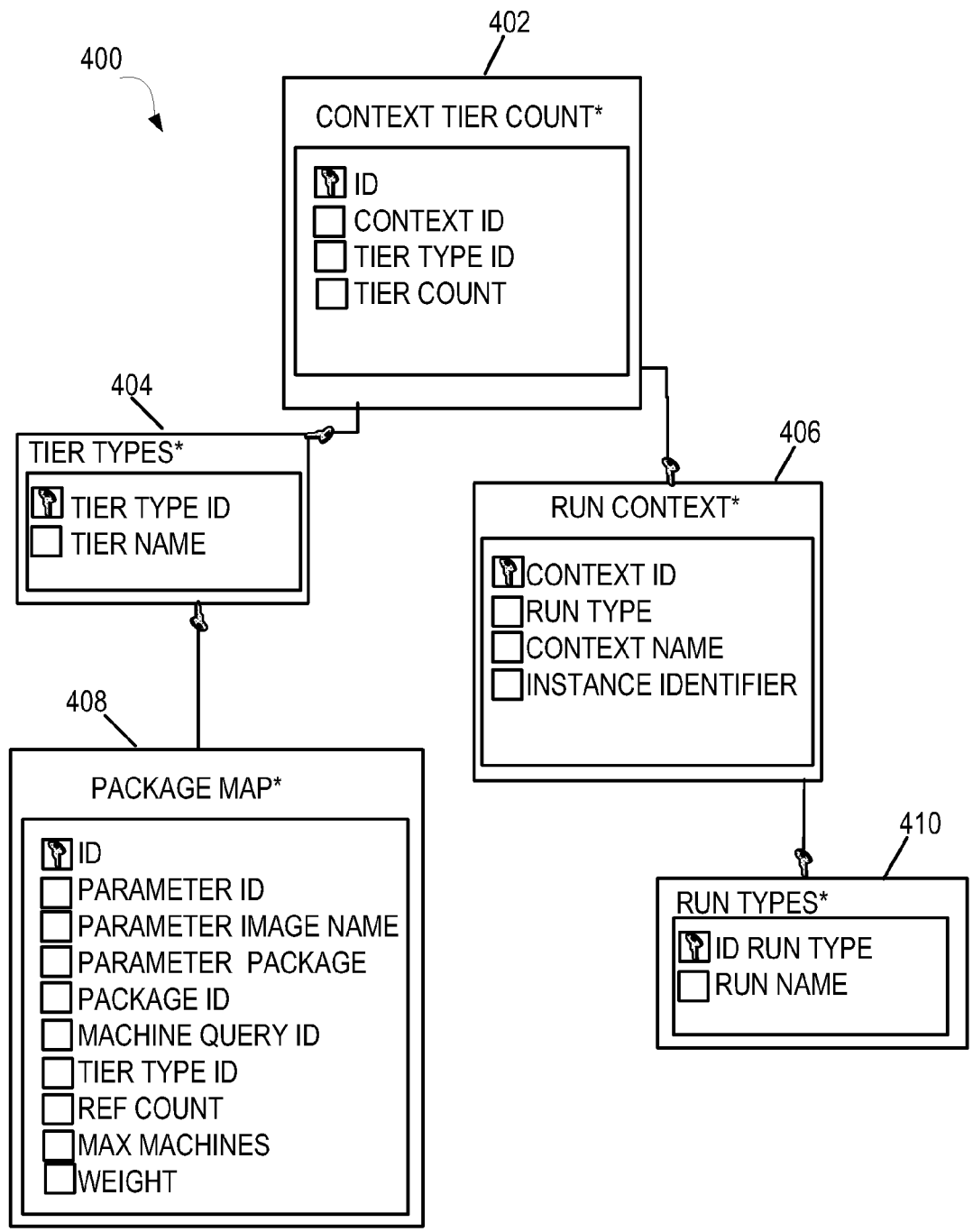
FIG. 4 is a diagrammatic view illustrating an exemplary database structure for implementing one implementation of test platform matrix system.

Turning now to FIGS. 2-4, the stages for implementing one or more implementations of test platform generation system 100 are described in further detail. In some implementations, the processes of FIG. 2-4 are at least partially implemented in the operating logic of computing device 500 (of FIG. 5).

FIG. 2 is a high level process flow diagram for one implementation illustrating the stages involved in generating a test platform matrix dynamically. In response to a user or system initiating the testing of a software program, a test platform matrix is generated for a particular test run (stage 202). As described in detail in FIG. 3, the test platform matrix is generated based on a combination of test coverage specifications and a history of test coverage from prior runs to ensure testing of different system configurations than prior system configurations tested in a most recent prior run. Test coverage specifications can include run types that are configured for multiple run contexts and tiers. Test coverage specifications can also include details for executing a specific test configuration. For example, the details for executing the specific test configuration could include an identifier for an executable file that can be launched to test the specific configuration. The details for executing the specific test configuration could also include any parameters needed to launch the executable file for the specific test configuration. These are just a few examples of the types of test coverage specifications that can be used. Test coverage specifications are described in further detail in FIGS. 3 and 4.

Once the test coverage specifications are retrieved, machines are provisioned for executing the test run according to the test platform matrix (stage 204). The term "provisioned" as used herein is meant to include the launching of a machine or machine instance, which can be on one or more separate physical machines than the machine provisioning it, or just a separate logical machine. Provisioning can include the installation of the test application or parts thereof. A separate machine is provisioned for each configuration contained in the test platform matrix to test the desired scenarios. Each machine then executes its respective part of the test platform matrix (stage 206) to test the software program with the specified configurations.

FIG. 3 is a process flow diagram for one implementation illustrating the stages involved in dynamically generating a text platform matrix for carrying out tests. This process can begin when a user or a program launches a test process that needs to test a given software program on multiple platforms. Test platform system determines the run type of the test to be executed (stage 302). The term "run type" as used herein is meant to include an instance of a whole topology that differs by one or more parameters. For example, run type could be a frequency for how often the test should run, or it could just be a name of the test. This run type can be determined based on a schedule, or based upon a manual decision.

Contexts are then retrieved for the run type of this test run (stage 304). The term "context" as used herein is meant to include a unique topology that a test run may execute on. A non-limiting example of a context can include the number of attached clients in a multi-tier application environment. Below is an example of a database SELECT statement that could be used to retrieve one or more run contexts for the particular run type:

SELECT*FROM RunContext WHERE RunType=<Run Type ID>

The number of tiers needed for each context is then determined (stage 306). The term "tier" as used herein is meant to include a node in the desired topology. The database is queried to determine this information, using a database query such as the following:

SELECT TierTypeID, TierCount FROM ContextTierCount WHERE
  ContextID = <ContextID>

One tier object is then created for each tier in each context (stage 308). The term "tier object" as used herein is meant to include an instance of a tier that is being iterated on to test a different configuration. In other words, a collection of tier objects is created such that the total number of each tier type identifier matches the tier count retrieved in the prior step. Then, for each of the newly created tier objects, package mapping information is retrieved for the lowest reference count (stage 310). The term "package mapping information" as used herein is meant to include information being tracked for each tier type. This information can include historical information about what parts of the desired tests have been covered in prior runs of the tests. The reference count for the package map record is incremented (such as by a value of one) after each iteration (stage 310). The term "reference count" as used herein is meant to include a count or other indicator of how many times a given configuration has been tested in prior test runs.

Some exemplary database statements that perform the retrieving of the package mapping information and the incrementing of the reference count are shown below:

SELECT TOP 1 * FROM PackageMap WHERE TierTypeID =
  TierObject.TierTypeID ORDER BY RefCount ASC
RefCount += 1

A machine is then provisioned for each tier object (stage 312). In one implementation, an existing automation framework can be used to provision a machine for each calculated tier object. In one implementation, one or more machines are provisioned by launching an executable file that is configured according to the package mapping information. In another implementation, one or more machines are provisioned by launching an operating system instance that is configured according to the package mapping information. In yet another implementation, one or more machines are provisioned by launching a virtual machine that is configured according to the package mapping information. Multiple combinations of techniques can be used for provisioning machines. In other words, one machine may be provisioned by launching a virtual machine, while another may be provisioned by launching an executable file. As shown in further detail in FIG. 4, each context can have an associated instance identifier that points to a machine instance that can be used for the test run, and this identifier determines what mechanism should be used to provision the particular machine.

FIG. 4 is a diagrammatic view illustrating an exemplary database structure for implementing one implementation of test platform matrix system. In one implementation, a run type data structure 410 (called RunTypes in FIG. 4) is used for storing run types to be tested over multiple test runs. The run type is not necessary for the desired platform calculation, but is used to aid in determining platforms for different types of test runs (daily, weekly, etc). The run type data structure 410 stores the names of user-definable run types that will be used to retrieve the platforms for the provided run type.

In one implementation, a run context data structure 406 (called RunContext in FIG. 4) is used to store relationships between the run types and the possible contexts for the run types. As described earlier, a context is defined as a unique topology that a test run may execute on. The run context data structure 406 stores the name(s) of user-definable contexts for each run type. A run type may have one or more contexts. For example, a user may have defined a run type called "DAILY" and he may have defined two contexts named "Server & Client" and "3 Tier". The user may then have decided that a run type of "DAILY" should be run only under the "3 Tier" context. In this case he would create one row in the run context table 406 to reflect this rule. The run context data structure 406 can include an instance identifier that stores an identifier for a machine instance (operating system instance, executable, virtual machine, etc.) that can be used for the test run for the associated context In one implementation, a tier type data structure 404 (called TierTypes on FIG. 4) is used for storing tier types for the run types and contexts. In other words, the tier type data structure 404 stores the names of user-definable tiers. As noted earlier, a tier is defined as a node in the desired topology. A tier can exist any number of times in a topology (or context) including zero.

In one implementation, a context tier count data structure 402 (called ContextTierCount on FIG. 4) is used to store an instance count for each tier type for each of the contexts. In other words, the context tier count data structure stores the instance count of each TierType for each Context. Using the above example, there may be a context called "3 Tier" and three TierTypes called "SQL SERVER", "WEB SERVER", and "IE7 CLIENT". The desired topology for the 3 Tier context may be 3 clients and 1 of each server. In this case the context tier count data structure 402 would contain the corresponding TierCount values combined with the appropriate TierType and Context ids.

In one implementation, a package mapping data structure 408 (called PackageMap on FIG. 4) stores details for each instance of the tier types. For example, there may be a Tier defined as "WEB SERVER" in the tier type 404 data structure. The package mapping data structure 408 would store the names and ids of each operating system that the "WEB SERVER" Tier can be run on. The RefCount column is used to store the total count of instances of this Tier over time. In one implementation, the code used to generate the desired platforms will increment the RefCount column every time a new instance of a Tier is created, so that it is marked as having been run (another time). In other words, the package mapping data structure 408 can store historical details from prior iterations of test runs. These historical details can be used for determining a configuration to be used in a next test run that was not already used in a most recent prior test run (or that was never used at all in a prior run, if the system is configured to test a different scenario every time).

Figure 5:
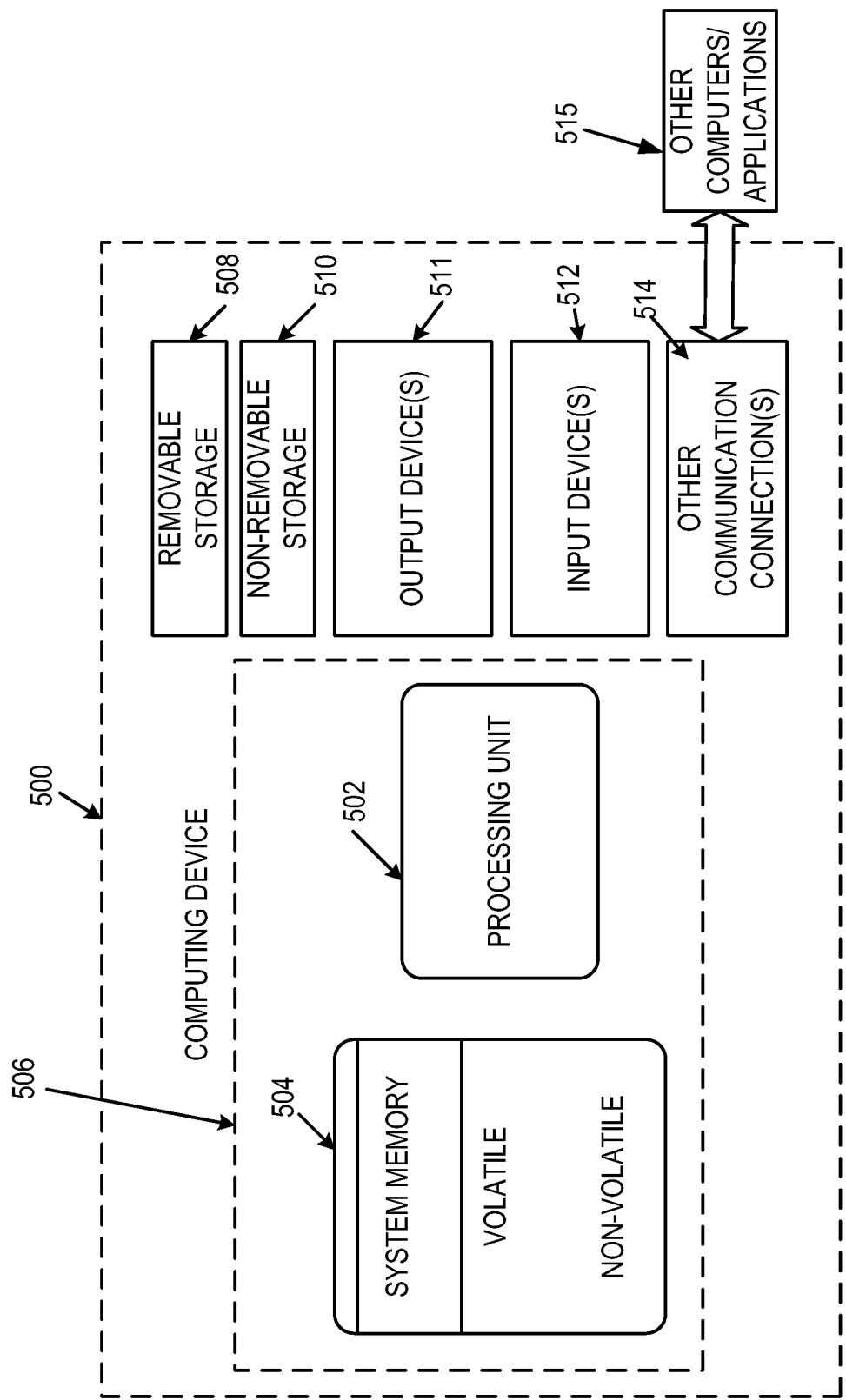
FIG. 5 is a diagrammatic view of a computer system of one implementation.

As shown in FIG. 5, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for generating and executing a test platform matrix for a next iteration of a test run comprising the steps of:
    determining a run type to be executed;
    based on the run type, retrieving one or more contexts for the run type from a database;
    determining a number of tiers needed for each of the contexts, wherein a tier is a node in a topology;
    creating a plurality of tier objects, with one tier object being created for each of the tiers for each of the contexts, wherein a tier object is an instance of a tier that is being iterated on to test a different configuration;
    for each of the tier objects, retrieving package mapping information for a package map record having a lowest reference count value, wherein the package mapping information comprises historical information about what parts of desired tests have been covered in prior iterations of the test run, and the reference count is an indicator of how many times a given configuration has been tested in prior iterations of the test run;
    provisioning a machine for each of the tier objects according to the retrieved package mapping information; and
    for each provisioned machine, launching an executable file that is configured according to the retrieved package mapping information.

2. The method of claim 1, wherein the run type to be executed is determined based on a schedule.

3. The method of claim 1, wherein the run type to be executed is determined based on a manual decision.

4. The method of claim 1, further comprising the steps of:
    incrementing a lowest reference count value of the package map record after retrieving the package mapping information.

5. The method of claim 4, wherein the lowest reference count value is incremented by a value of one.

6. The method of claim 1, wherein the machine is provisioned by launching a virtual machine that is configured according to the package mapping information.

7. The method of claim 1, wherein the machine is provisioned by launching an operating system instance that is configured according to the package mapping information.

8. The method of claim 1, wherein each context has an instance identifier which points to a machine instance that can be used for the test run.

9. A computer storage memory having a data structure stored thereon comprising:
    a run type data structure for storing run types to be tested over a plurality of test runs;
    a run context data structure for storing relationships between the run types and contexts for the run types;

a tier type data structure for storing tier types for the run types and contexts;

a context tier count data structure for storing an instance count for each tier type for each of the contexts; and a package mapping data structure for storing details for each instance of the tier types, the details comprising configuration information for provisioning one or more machines, the package mapping data structure further storing a reference count that is an indicator of how many times a given configuration has been tested in prior test runs, the one or more machines provisioned by launching an executable file configured according to the details stored in the package mapping data structure including parameters required to launch the executable file for a specific configuration.

10. The computer storage memory of claim 9, wherein the package mapping data structure is operable to store historical details from prior iterations of the test runs.

11. The computer storage memory of claim 10, wherein the historical details are operable to be used for determining a configuration to be used in a next test run that was not already used in a most recent prior test run.

12. The computer storage memory of claim 9, wherein the run context data structure includes an instance identifier that is operable to store an identifier for a machine instance that can be used for the test run for an associated context.

* * * * *